United States Patent [19]

Hart

[11] 4,207,869
[45] Jun. 17, 1980

[54] SOLAR COLLECTOR CONSTRUCTION

[76] Inventor: Douglas R. S. Hart, 886 Palmerston Ave., Toronto, Ontario, Canada, M6G 2S2

[21] Appl. No.: 908,541

[22] Filed: May 22, 1978

[30] Foreign Application Priority Data

May 24, 1977 [GB] United Kingdom ............... 21925/77

[51] Int. Cl.² ................................................. F24J 3/02
[52] U.S. Cl. .................................... 126/450; 126/429; 126/441; 52/473
[58] Field of Search ............... 126/270, 271, 429, 441, 126/450; 237/1 A; 52/473, 788, 789, 790

[56] References Cited

U.S. PATENT DOCUMENTS

| | | |
|---|---|---|
| 4,046,135 | 9/1977 | Root et al. ............................ 126/271 |
| 4,068,361 | 1/1978 | Root ................................. 126/271 X |
| 4,084,574 | 4/1976 | Golay ................................... 126/270 |
| 4,106,483 | 8/1978 | Barber, Jr. ............................ 126/271 |

*Primary Examiner*—Carroll B. Dority, Jr.
*Assistant Examiner*—Lee E. Barrett
*Attorney, Agent, or Firm*—Sim & McBurney

[57] ABSTRACT

This invention provides a solar collector construction consisting of two spaced-apart rigid panels with aligned edges, and a flexible web structure with a width substantially the same as the desired spacing between the panels. The web is strung in tension between spacing elements at the edges of the panels, thereby to define a plurality of adjacent chambers having small vertical dimension and extended horizontal dimension. The chambers function to limit the convective heat interchange between the panels.

18 Claims, 8 Drawing Figures

SOLAR COLLECTOR CONSTRUCTION

This invention relates generally to solar collectors, and has to do particularly with a solar collector construction in which a honeycomb effect is provided to minimize convective and radiative heat losses.

In one known solar collector construction, the sun's radiation passes firstly through a glass or other transparent panel and then falls against a blackened heat-conductive collector panel which is parallel with but spaced from the transparent panel. The collector panel is heated by the sun's rays, and air-passage means on the other side of the collector panel allow the heat absorbed by the collector panel to be transferred to moving air, from where it can be passed either directly to a space being heated or to a storage location.

If the volume between the transparent panel and the blackened collector panel is left open, there will be a strong tendency for the air in this open space to begin to circulate due to the high temperature of the collector panel and the relatively low temperature of the transparent panel, thus setting up a circular pattern which is able to transfer some of the heat from the collector panel back to the transparent panel from where it is lost to the exterior. Radiative transfer will also occur.

It has been proposed to dispose within the space existing between the transparent panel and the blackened collector panel a honeycomb or partition arrangement in which partitions of plastic sheet material are arranged in closely spaced parallel relation in order to restrain air circulation patterns. Usually the partitions are disposed horizontally or nearly so. Conventional constructional techniques for providing these partitions of plastic sheet material are often cumbersome and require complicated support mechanisms to keep the partitions in proper alignment and to support their weight.

The present invention seeks to provide a convenient and novel manner of supporting honeycomb-defining sheets within the space between the two main panels of the solar collector.

It will be appreciated from the detailed description given later in this disclosure that the technique of supporting honeycomb-defining sheets within a given space can be applied not only to constructions in which one of the main panels is blackened, but also in constructions in which both of the main panels are transparent, and where a further blackened panel is provided outside of the two transparent panels, with air to be heated passing upwardly between the blackened panel and the unitary construction consisting of the two transparent panels. It will further be appreciated that the construction disclosed herein can be applied with advantage to window constructions in which two spaced-apart transparent panels are provided, in order to reduce convection losses between the outer and inner transparent panel.

Accordingly, this invention provides a construction for minimizing convective air movement between two spaced-apart rigid panels having aligned peripheral edges that include two opposed side edges for each panel, and also for bracing the panels in spaced relation while keeping them substantially in a single, mutual, spatial orientation, the construction comprising:

four longitudinal members each having an elongated slot receiving one of said four side edges, each said member defining an elongated recess in which bar elements can be received at vertically spaced intervals, the recess of each member being directed perpendicular to the slot thereof, and opening toward the opposing rigid panel, a plurality of vertically spaced bar elements along each pair of aligned side edges, each bar element spanning between the two panels and having its ends lodged in the respective elongated recesses, a flexible web having a width substantially the same as the spacing between the panels, the web being strung back and forth in tension between the bar elements and between the panels, thereby defining a plurality of adjacent chambers, and means restraining the adjacent pairs of longitudinal members against separating.

Further, this invention provides a method of constructing a solar collector, including the steps:

providing two rigid panels in spaced-apart relation, the panels having aligned peripheral edges that include opposed side edges, providing longitudinal members affixed along both of the side edges of each panel by virtue of slots receiving the respective edges, the said longitudinal members further defining elongated recesses in which bar elements can be received at vertically spaced intervals, the recesses for each panel opening toward the other panel, beginning at corresponding ends of two aligned side edges of the panels by affixing one end of an elongated flexible web with respect to the panels, the flexible web having a width substantially the same as the desired spacing between the panels, inserting a bar element at the corresponding end of the recesses in the opposite aligned edges of the panels after first extending the flexible web across between the panels, bending the flexible web around the bar element and extending it back in overlapping relation with the first reach of the web, inserting a further bar element above the original bar element and bending the flexible web around the further bar element, extending the web again toward the opposite edges parallel with the reaches already laid, and inserting a still further bar element adjacent the first bar element, and continuing in this fashion until the entire volume between the two panels is filled with boustrophedonically woven web defining adjacent elongated chambers.

Three embodiments of this invention are illustrated in the accompanying figures, in which like numerals denote like parts throughout the several views, and in which.

The key to understanding this invention is the concept that both of the main panels of the composite construction are utilized to act as compression elements and support in tension a plastic web structure strung between support elements at the panel sides, the web structure defining a plurality of adjacent chambers within the space between the main partitions, these chambers being loosely referred to in the art as a "honeycomb arrangement". In a specific embodiment, there are arranged down the lateral side edges of the solar collector a series of parallel, spaced-apart bar elements, arranged in such a way that the single continuous band or strip of flexible plastic webbing can be woven about the elements in a boustrophedonic configuration, thus providing a plurality of spaced-apart, parallel and horizontal panels throughout the space defined between the two main panels. An aluminum extrusion is contemplated by this invention, the same being adapted to fit and grip the side edges of both of the main panels, the extrusion being further adapted to support bar elements for holding the continuous web in tension.

Figure 1:
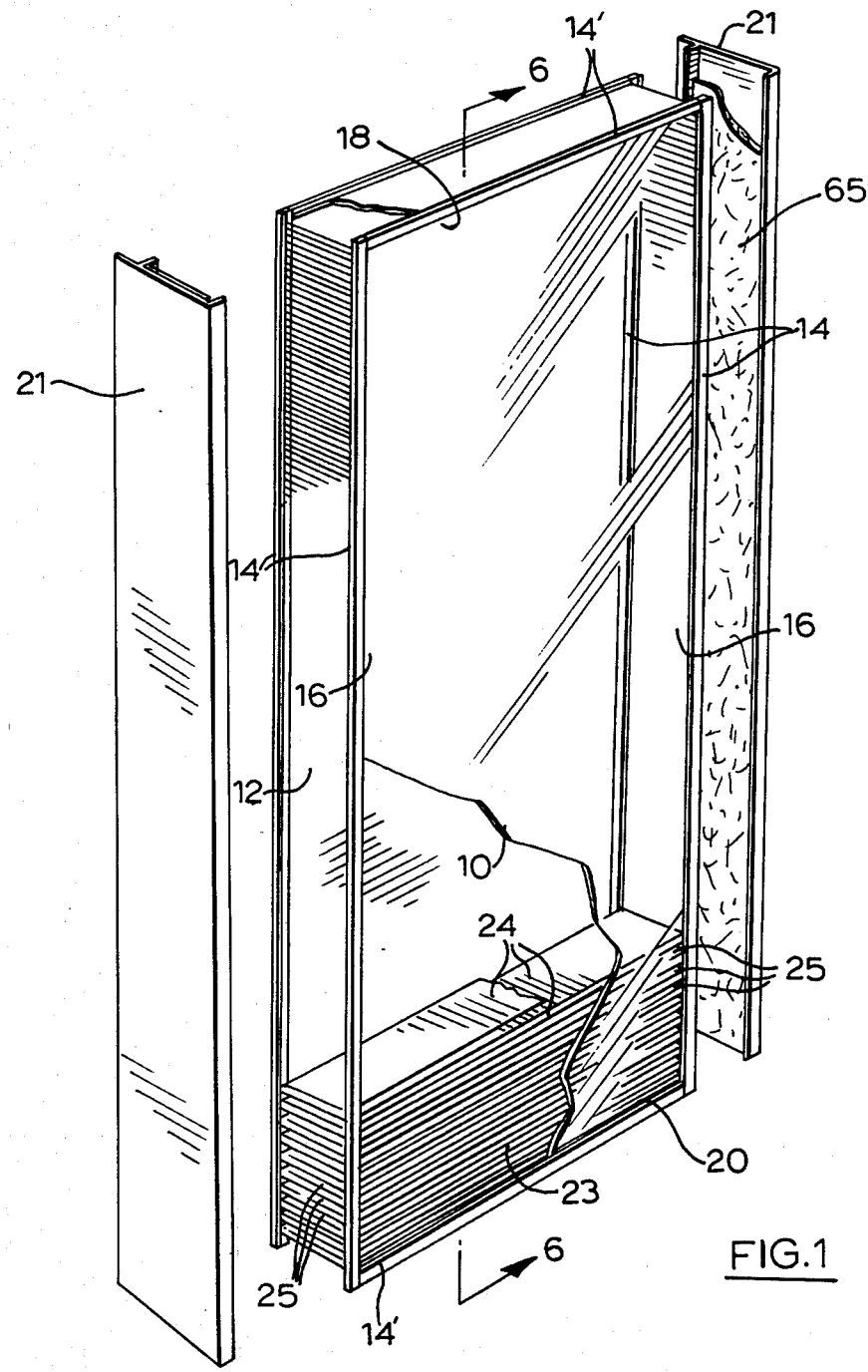
FIG. 1 is a partly broken-away, exploded, perspective view of a solar collector construction built in accordance with this invention.

Attention is now directed to FIG. 1, which shows, in exploded perspective view, a first main panel 10, a second main panel 12 spaced from the panel 10 in parallel relation therewith, and longitudinal members constituted by extrusions 14 which will be described in greater detail with reference to other figures.

It will be noted that the two main panels 10 and 12 are substantially of rectangular configuration, and thus each includes two opposed side edges 16, a top edge 18 and a bottom edge 20.

Two side wall members 21 are also provided, the construction of which will be described in greater detail at a later point in this description.

As seen at the bottom in FIG. 1, a flexible web 23 is arranged in sinusoidal or boustrophedonic configuration in the volume defined between the two main panels 10 and 12, the web 23 defining a plurality of "reaches" 24, as they will be hereinafter referred to, which extend in parallel, horizontal configuration, thereby to define between each adjacent pair of reaches 24 a vertically narrow but horizontally extended chamber 25.

Before discussing the means by which the web 23 is maintained in the configuration shown in FIG. 1, the longitudinal members 14 must be described.

Figure 3:
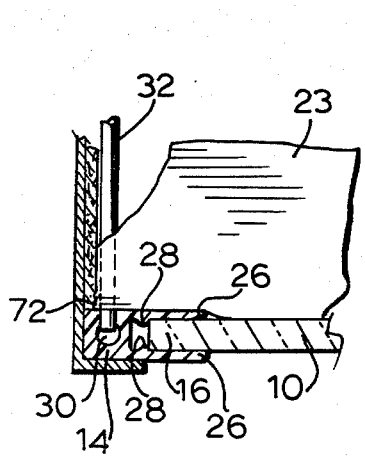
FIG. 3 is a horizontal section showing a detail.

Attention is directed to FIG. 3 which shows the longitudinal element 14 to include two parallel, spaced-apart legs 26 adapted to receive the edge portion of one of the panels 10 or 12. Each leg 26 includes, remote from its free end, an inward rib 28 which defines the limit to which the panel can be shoved into the space defined between the legs 26. This construction allows a degree of resilient flexibility in the legs 26 in order to ensure a proper grip against the surfaces of the panel inserted between the legs, and provides a space for fastener members, if desired.

The longitudinal member 14 also defines a recess 30 adapted to receive the ends of bar elements which are utilized to support the turn-around locations in the sinusoidally wound web 23, as will now be more particularly described.

Figure 4:
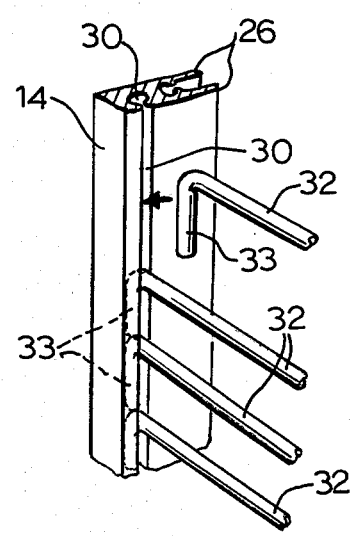
FIGS. 4 and 5 show, respectively, the first and second embodiments of the support elements for the main chamber-defining component of this invention.

Attention is first directed to FIG. 4, which shows a first embodiment of the bar elements. In FIG. 4, each bar element consists of an elongated rod 32 which has its two ends bent at right angles to define legs 33 (only one leg 33 for each rod 32 being visible in FIG. 4), such that the rod defines a wide U-shape. The legs 33 constituting the bent ends of the rods 32 are adapted to be received and lodged in opposing slots 30 of aligned but spaced longitudinal members 14 on corresponding side edges of the two panels 10 and 12. It will be clear that the legs 33 of the rods 32 constitute automatic spacing means to keep the rods 32 apart from each other at a given, pre-determined spacing.

Preferably, in view of the finite thickness of the rods 32, and in view of the desirability, both aesthetically and practically, of having the individual chambers 25 of uniform vertical dimension throughout the horizontal length thereof, it would be arranged to have alternate ones of the rods 32 provided with slightly shorter and slightly longer legs 33, so that the spacings between the rods 32 would vary in alternating sequence between the greater value and a lesser value. The web 23 would be wound around each pair of more closely spaced rods 32, i.e. would link such rods, whereas it would not link the pairs of rods which are more distant from each other.

Figure 7:
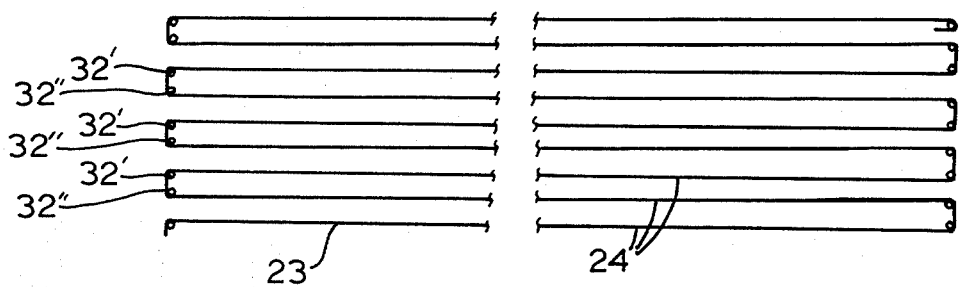
FIG. 7 is a schematic diagram showing the manner in which the chamber-defining component is wound.

In FIG. 7, a simplified diagram of this procedure is illustrated. Looking at the left in FIG. 7, the rods 32' would have short legs 33, whereas the rods 32" would have longer legs, whereby each rod 32" is closer to the rod 32' above it, than it is to the rod 32' below.

A similar arrangement would be utilized at the other end, in order that the web 23 would define individual reaches 24 which are identically spaced from each other, and which remain parallel throughout.

Figure 5:
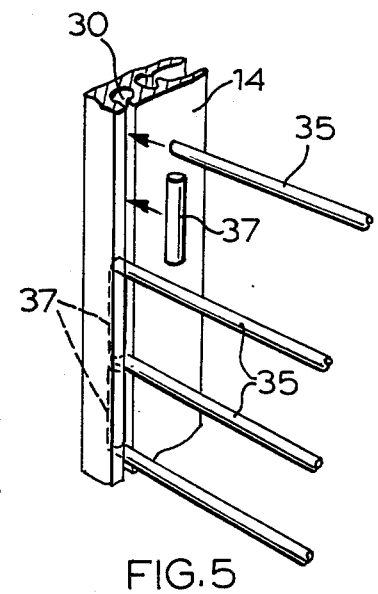

FIG. 5 shows a second embodiment of the bar members, which in this case consist of rectilinear rods 35 which are not bent, the ends of which are inserted into the recess 30 of the longitudinal member 14. Between each adjacent pair of rods 35 are short spacer members 37 which act in the same manner as the legs 33, and which keep the plurality of rods 35 apart in accordance with a given spacing pattern. Again in the FIG. 5 embodiment, it is desirable to have the spacings between sequential adjacent pairs of rods 35 alternate between a greater spacing and a lesser spacing, for reasons already dealt with in connection with FIG. 4.

Figure 8:
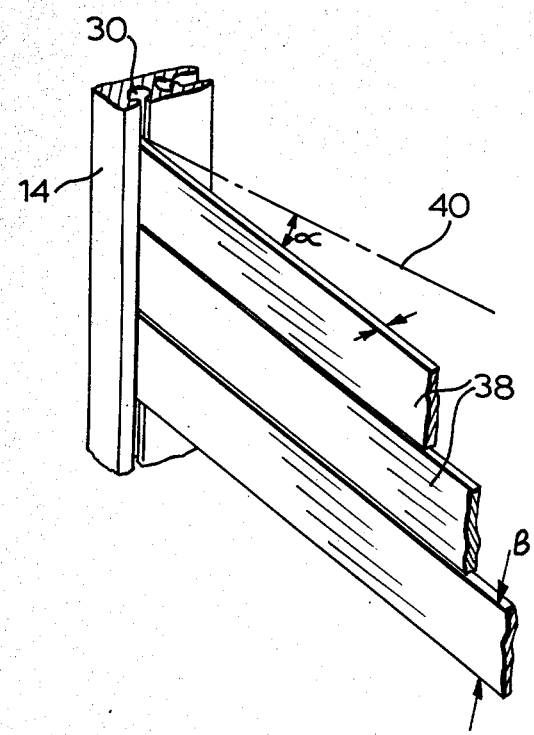
FIG. 8 is a schematic diagram of a building employing solar collectors constructioned in accordance with this invention.

Attention is now directed to FIG. 8, which shows the third embodiment of the bar elements, the bar elements in FIG. 8 being not rods but rather slat-like elements 38 which have a thickness A small enough to be received in the slot 30, a length sufficient to stand between opposing slots at the edges of the two main panels 10 and 12, and a width B equivalent to the desired vertical dimension of a chamber defined between adjacent reaches of the web 23. In the case of the embodiments shown in FIGS. 4 and 5, the rods 32 and 35 are arranged substantially at right angles to the main direction of the longitudinal members 14. However, in the case of the third embodiment shown in FIG. 8, the bar elements 38 are sloped downwardly through an angle $\alpha$ from a hypothetically line 40 which is perpendicular to the longitudinal member 14. The angle $\alpha$ may range between 0° and about 25°, and the purpose of this angulated provision is to cause the chambers 25 also to be angulated with respect to the main panels 10 and 12, so that the solar collector as a whole can be tilted back away from the vertical while allowing the chambers defined between the reaches of the web 23 to remain closer to the horizontal. It will be understood that, depending upon the latitude of a particular installation, the sun's angular elevation in the sky during the season of greatest usefulness of the solar collector will vary. Ideally, maximum efficiency in any given solar collector of this kind is obtained when the incident radiation from the sun falls perpendicularly upon the collector.

However, small departures from perpendicularity (for example up to about 15° or so) do not significantly affect the efficiency of the collector.

Figure 2:
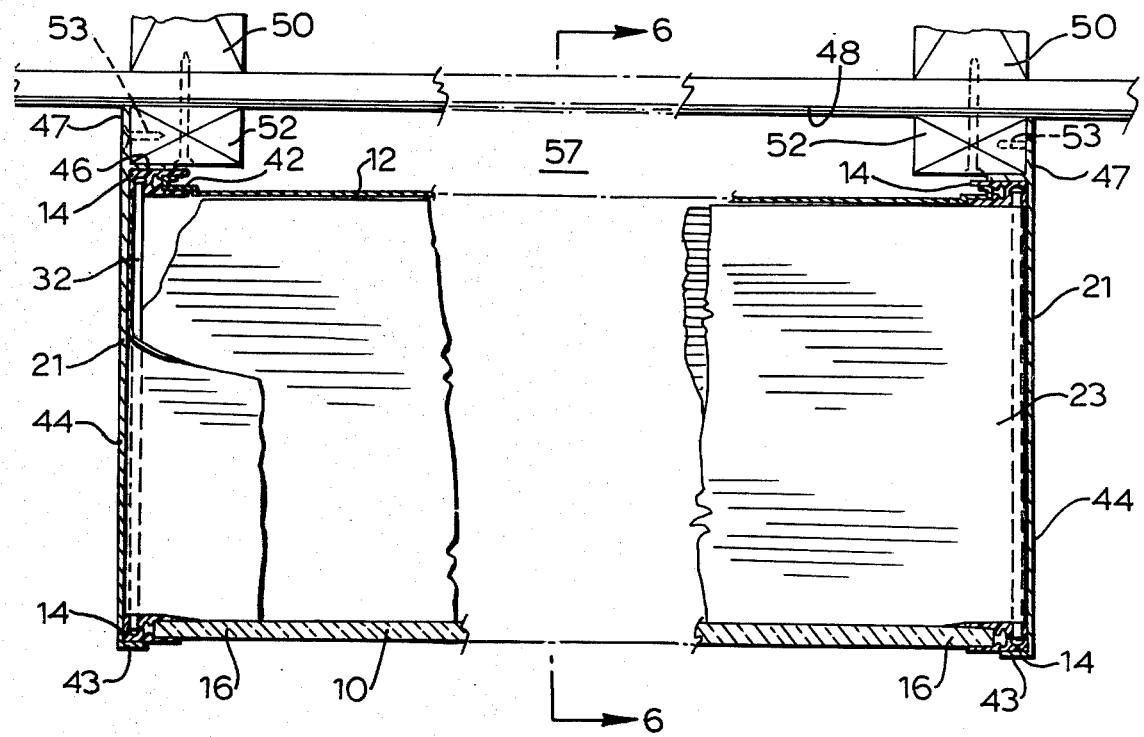
FIG. 2 is a horizontal section through the solar collector of FIG. 1, in assembled condition, and in juxtaposition with a building wall.
Figure 6:
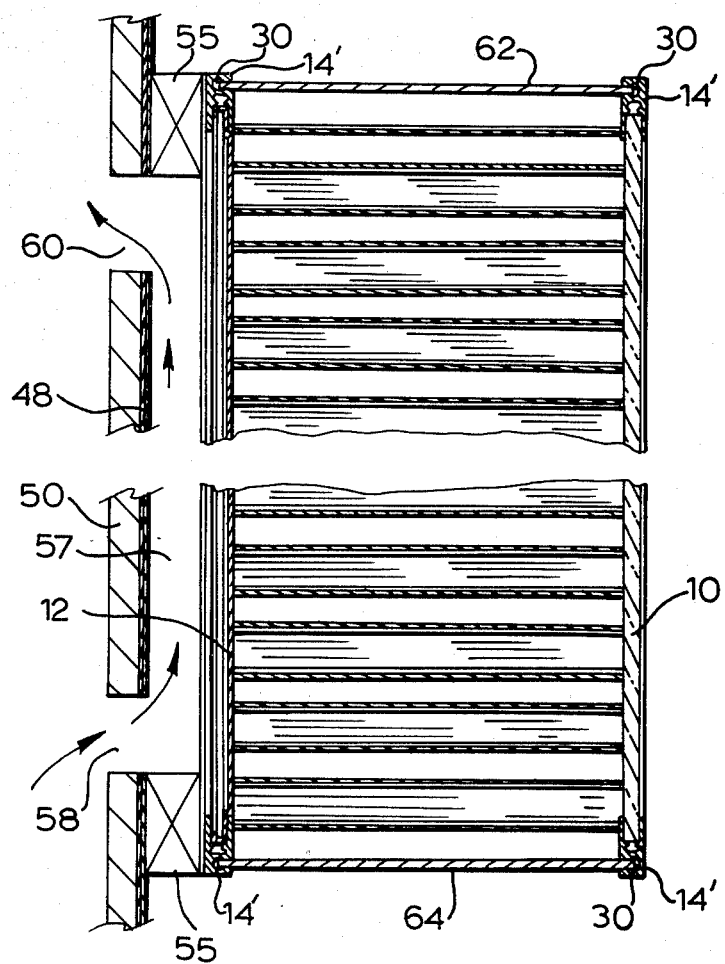
FIG. 6 is a vertical sectional view taken at the line 6—6 in FIG. 1.

Attention is now directed to FIGS. 2 and 6, for a further description of the way in which the solar collector described herein functions to heat air being utilized as a heat-transfer medium.

In FIG. 2, it can be seen that the collector panel 12 includes a main flat central portion, which is bent or deformed at the edges to define a J-section 42 adapted to fit snugly between the legs 26 of the corresponding longitudinal member 14, the sizing being such that the legs clamp the J-section in a secure grip. With the particular construction of the embodiment shown in FIG. 2, the collector panel 12 may be of aluminum or steel which is blackened on both sides. The side walls 21, which extend the entire vertical height of the solar collector as seen in FIG. 1, are shown in position in FIG. 2. Each wall member 21 includes a forward flange 43 adapted to grip the forward corner of the appropriate longitudinal member 14, a main panel 44 which acts to close in the open ends of the chambers 25, an intermediate flange 46 which grips the rear outside corner of the opposing or rearward longitudinal member 14, and a rearward extension 47. In FIG. 2, a wall panel 48 of a building is secured to the usual studs 50, and two upright constructional members 52 are nailed to the outside of the building (which is the lower side in FIG. 2) at a spacing such that their outside edges are the same distance apart as the outside surfaces of opposed longitudinal members 14 at the opposite side edges of a single panel. The rearward extension 47 of each of the wall panels 21 is dimensioned such that the constructional members 52 fit without any slack or play between the flange 46 and the wall 48 of the building, when the rearward extension 47 abuts the wall 48 of the building. Screws, nails or other suitable fasteners 53 are provided to secure the rearward extensions 47 into the upright constructional members 52 at spaced vertical intervals.

It will thus be understood that the construction just defined establishes a definite spacing between the panels 10 and 12 for the following reasons. The panels 10 and 12 are restrained from separating from each other because of the flanges 43 and 46 on the wall panels 21, and are restrained from approaching each other by virtue of the rod members 32 which are interposed between the longitudinal members 14 and do not allow the latter to move closer to each other than a given distance, corresponding to the design parameters for the solar collector.

As seen in FIG. 6, further constructional members 55 are provided against the wall 48 of the building at locations corresponding to the top and bottom of the solar collector. There is thus defined, between the solar collector and wall 48, a space 57 which is enclosed with respect to the outside ambience. The space 57 is in contact with the rearward surface of the collector panel 12, and air within the space 57 is capable of picking up heat from the panel 12 when the latter is heated by the sun's radiation. Openings 58 and 60 may be provided at opposite ends of the space 57, so that air can pass in through one opening and out through the other, for example following the flow path shown by the arrows in FIG. 6. Thus, air passing through the space 57 will be heated, and its temperature at exit will be higher than that at entry.

FIG. 6 also shows the construction at the top and bottom of the solar collector. It will be seen that further longitudinal members 14' are provided along the top and bottom edges of both panels 10 and 12, and that solid top and bottom panels 62 and 64, respectively, are positioned with their forward and rearward edges received in the recesses 30 of the respective longitudinal members 14'.

In order to decrease still further the heat losses from the solar collector, insulation layers 65 can be provided, as shown in FIG. 1, against the inside surface of the wall members 21 between the flanges 43 and 46.

In the fabrication of the solar collector shown in the Figures, it will be appreciated that the progressive creation of the different chambers 25 between adjacent reaches 24 of the web 23 is done in a linear fashion, beginning at one end (for example the bottom) of the solar collector, and progressing upwardly. In assembly, the free end of the web is first attached at or near a bottom corner (assuming one starts with the bottom) of the solar collector. The web is then pulled across to the other side in the horizontal direction, and a first bar element is put into position in the recesses 30 of the longitudinal members 14. It is here assumed that the two panels 10 and 12 have already had the longitudinal members 14 and 14' secured to their edges, but are otherwise loose and separated from each other. If the operator is working with rod-like bar elements such as those shown in FIGS. 4 and 5, two such rods will have to be put into position above the web before the web can be lifted up and brought back toward the other side parallel to the first reach. If the construction is taking place with bar elements such as those shown in FIG. 8, a bar element is inserted both above and below the web. After the web has been pulled back toward the original side again, new web spacing elements are provided on that original side, this constituting either two further rods (32 or 35), or a single bar element of the type shown in FIG. 9. After a bar element(s) is implanted above the web, again the web would be wrapped around and stretched over toward the opposite side. This procedure continues, with the operator slipping the web-spacing devices first into one side and then into the other as the web is wound boustrophedonically back and forth to define the chambers 25. When this procedure has been completed, the wall panels 21 are put into place, and may be secured to the longitudinal members 14 by means not shown, but which may include fasteners, spot welding techniques, or the like. It will be understood that the top and bottom panels 62 and 64 would also have been inserted at an appropriate time during the arrangement of the web 23 to form the chambers 25.

Attention is directed now to FIG. 3, which illustrates the technique by which the web 23 is made to extend right up to the surface of the panel 10, despite the finite thickness of the inner leg 26 of the longitudinal member 14. As can be seen in FIG. 3, the web is caused to be bunched adjacent the longitudinal member 14, and it will be understood that the actual width dimension of the web 23 is to be the same as the design distance from the inside of the transparent panel 10 to the inside of the collector panel 12. The bunching shown at 72 in FIG. 3 will be automatic when the operator putting together the collector ensures that the web is wound around the bar elements in a particular way. This can be judged by eye quite easily.

It will be appreciated that the blackened metal collector panel 12 could be replaced with a transparent panel, and a blackened collector panel could instead be placed directly against the wall 48 (see FIG. 2). This would accomplish substantially the same degree of heating of the air within the space 57. Moreover, the construction in which two transparent panels are utilized would be a suitable one for windows or other light-access components, for example in greenhouses.

Instead of using wall members 21 to hold the panels 10 and 12 together in rigid formation, it would be possible to provide elongated fasteners extending through the elongated members 14 between the ribs 28 and the bottom of the recess defined by the legs 26.

It should also be understood that the employment of the main panels in compression as structural members maintaining the web in tension can be done without necessarily requiring the web to be continuous. It is contemplated that the web could be in the form of discrete lengths long enough to span between the panel side edges, each length being secured at either end to separate bar elements which in turn are received in the appropriate recesses in the members 14.

Finally, in the arrangement shown in FIGS. 2 and 6, it should be appreciated that the greatest degree of efficiency can be attained by ensuring that both surfaces of the collector panel 12 are blackened and that a blackened layer of paint, metal or the like is applied to the opposite surface of the space 57, i.e. to the wall 48.

I claim:

1. A construction for minimizing convective air movement between two spaced-apart rigid panels having aligned peripheral edges that include two opposed side edges for each panel, and also for bracing the panels in spaced relation while keeping them substantially in a single, mutual, spatial orientation, the construction comprising:
   four longitudinal members each having an elongated slot receiving one of said four side edges, each said member defining an elongated recess in which bar elements can be received at vertically spaced intervals, the recess of each member being directed perpendicular to the slot thereof, and opening toward the opposing rigid panel,
   a plurality of vertically spaced bar elements along each pair of aligned side edges, each bar element spanning between the two panels and having its ends lodged in the respective elongated recesses,
   a flexible web having a width substantially the same as the spacing between the panels, the web being strung back and forth in tension between the bar elements and between the panels, thereby defining a plurality of adjacent chambers,
   and means restraining the adjacent pairs of longitudinal members against separating.

2. The invention claimed in claim 1, in which the panels are rectangular.

3. The invention claimed in claim 1 or claim 2 in which the bar elements are straight rods, each end of a rod being lodged in a slot.

4. The invention claimed in claim 1 or claim 2, which includes spacer means between adjacent ends of bar elements in a given slot.

5. The invention claimed in claim 1 or claim 2, in which the bar elements are rods having ends bent at right angles to define a wide U-shape, the bent ends of each rod being lodged in opposing slots, whereby the bent ends constitute spacer means.

6. The invention claimed in claim 1 or claim 2, in which the bar elements are elongated members with a width equivalent to the desired vertical dimension of a chamber defined by the web.

7. The invention claimed in claim 1 or claim 2, in which one panel is of transparent material, and the other is of blackened metal, the blackening being on both surfaces of said other panel.

8. The invention claimed in claim 1 or claim 2, in which the bar elements are all obliquely disposed with respect to the planes of the rigid panels.

9. The invention claimed in claim 1 or claim 2, in which the web has a width greater than the least distance between opposed longitudinal members and at least as great as the inter-panel distance, whereby to substantially seal each chamber against the respective panels.

10. A solar collector construction, comprising:
    two spaced-apart rigid panels having aligned peripheral edges that include opposed straight side edges,
    longitudinal members for the side edges of each panel, each longitudinal member having a first slot for receiving the edge of the respective panel and a second slot at right angles to the first slot, the second slots of adjacent longitudinal members on aligned side edges of panels opening toward each other,
    a plurality of vertically spaced bar elements along each pair of aligned side edges, each bar element spanning between the two panels and having its ends in the second slots of respective longitudinal members,
    a flexible web having a width substantially the same as the spacing between the panels, the web being strung boustrophedonically around the bar elements between the panels, thereby defining a plurality of horizontally elongated adjacent chambers,
    means restraining the adjacent pairs of longitudinal members against separating,
    and means closing the ends of the chambers.

11. The invention claimed in claim 10, in which the panels are rectangular with straight top and bottom edges, and in which further said longitudinal members are provided along the top and bottom edges of each panel with the panel edges received in the first slots thereof, partition means with edge portions lodging in the second slots thereof and spanning between the panels.

12. The invention claimed in claim 10 or claim 11, in which the bar elements are all identically obliquely sloped with respect to the planes of the rigid panels, the angle between the bar elements and a perpendicular to the rigid panels lying between about 10° and about 25°.

13. The invention claimed in claim 10 or claim 11, in which one of said panels is transparent and the other is of radiation-absorbing nature.

14. The invention claimed in claim 10 or claim 11, in which one of said panels is transparent and the other is of blackened metal, with the blackening directed toward said one of said panels.

15. A method of constructing a solar collector, including the steps:
    providing two rigid panels in spaced-apart relation, the panels having aligned peripheral edges that include opposed side edges,
    providing longitudinal members affixed along both of the side edges of each panel by virtue of slots receiving the respective edges, the said longitudinal members further defining elongated recesses in which bar elements can be received at vertically spaced intervals, the recesses for each panel opening toward the other panel, beginning at corresponding ends of two aligned side edges of the panels by affixing one end of an elongated flexible web with respect to the panels, the flexible web having a width substantially the same as the desired spacing between the panels, inserting a bar element at the corresponding end of the recesses in the opposite aligned edges of the panels after first extending the flexible web across between the panels, bending the flexible web around the bar element and extending it back in overlapping relation with the first reach of the web, inserting a further bar element above the original bar element means and bending the flexible web around the further bar element, extending the web again toward the opposite edges parallel with the reaches already laid, and inserting a still further bar element adjacent the first bar element, and continuing in this fashion until the entire volume between the two panels is filled with boustrophedonically woven web defining adjacent elongated chambers.

16. The method claimed in claim 15, in which each bar element includes two rod-like shafts with spacing means between them, and with spacing means between adjacent pairs of such shafts, the spacing means being contained within the recesses.

17. The method claimed in claim 15, in which each bar element includes a solid bar having a thickness sufficient to allow it to be received in the recesses, a length sufficient to span between the two panels, and a width substantially equivalent to the smaller dimension of the chambers to be defined by the boustrophedonically wound web; there being further provided, in sequence between each adjacent pair of solid bars along corresponding edges of the panels, additional solid bars identical to those already defined, which act as spacers and about which the web is not turned.

18. The invention claimed in claim 16 or claim 17, in which the components constituting said bar elements are inserted so as to be obliquely disposed with respect to the planes of the rigid panels.

* * * * *